US007890985B2

(12) United States Patent
Bowra et al.

(10) Patent No.: US 7,890,985 B2
(45) Date of Patent: Feb. 15, 2011

(54) SERVER-SIDE MEDIA STREAM MANIPULATION FOR EMULATION OF MEDIA PLAYBACK FUNCTIONS

(75) Inventors: Todd Bowra, Redmond, WA (US); Ashley C. Speicher, Redmond, WA (US); Nicholas J. Fang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 912 days.

(21) Appl. No.: 11/438,408

(22) Filed: May 22, 2006

(65) Prior Publication Data

US 2007/0271388 A1   Nov. 22, 2007

(51) Int. Cl.
G06F 15/16 (2006.01)
(52) U.S. Cl. .................. 725/88; 725/102; 725/114; 725/82; 725/91; 386/217; 386/220
(58) Field of Classification Search .................. None
See application file for complete search history.

(56) References Cited

U.S. PATENT DOCUMENTS

| 6,031,584 | A * | 2/2000 | Gray ..................... 375/240.28 |
| 6,065,050 | A | 5/2000 | DeMoney |
| 6,424,789 | B1 * | 7/2002 | Abdel-Mottaleb ........... 386/52 |
| 2001/0027493 | A1 | 10/2001 | Wallace |
| 2002/0016970 | A1 | 2/2002 | Negishi et al. |
| 2003/0163824 | A1 | 8/2003 | Gordon et al. |
| 2003/0228018 | A1 | 12/2003 | Vince |
| 2003/0236906 | A1 * | 12/2003 | Klemets et al. ............. 709/231 |
| 2004/0078829 | A1 | 4/2004 | Patel et al. |
| 2004/0210604 | A1 | 10/2004 | Li et al. |
| 2005/0114909 | A1 | 5/2005 | Mercier |
| 2005/0183120 | A1 | 8/2005 | Jain et al. |
| 2005/0267948 | A1 | 12/2005 | McKinley et al. |

(Continued)

FOREIGN PATENT DOCUMENTS

WO    WO0235832    5/2002

(Continued)

OTHER PUBLICATIONS

Whitehead,"RE: [MMUSIC] SIP-RSTP Draft", http://www1.ietf.org/mail-archive/web/mmusic/current/msg04051.html.

(Continued)

*Primary Examiner*—Andrew Y Koenig
*Assistant Examiner*—Rong Le

(57) ABSTRACT

A media server in a home entertainment network allows a media rendering device to act as a digital media receiver. The media server enables trick mode functions such as scan forward or reverse, slow motion, pause, and seek on rendering devices with capabilities limited to 1× playback. The media server receives commands from user input at the rendering device transmitted over the network to the media server. The media server manipulates the media stream before transmission over the network by deleting or adding frames to the media stream as necessary to emulate the desired playback functions and replacing frame timestamps to create a media stream that appears to the media rendering device as a sequential 1× stream. The transmitted media stream may not contain all of the media content stored in the corresponding media file on the media server, thus avoiding limitations on the download bandwidth and local client storage.

24 Claims, 8 Drawing Sheets

U.S. PATENT DOCUMENTS

2006/0007960 A1* 1/2006 Liu et al. .................... 370/503
2006/0117357 A1* 6/2006 Surline ........................ 725/90
2006/0140492 A1* 6/2006 Akiyoshi et al. ............ 382/236
2009/0282444 A1* 11/2009 Laksono et al. ............... 725/89

FOREIGN PATENT DOCUMENTS

WO   WO2004082150   9/2004

OTHER PUBLICATIONS

"GravityLab Multimedia", http://www.gravlab.com/hosting/realserver.html.

"MediaBase XMP v8.0TM", http://www-03.ibm.com/industries/media/doc/content/bin/Mediabase_XMP_Datasheet.pdf.

* cited by examiner

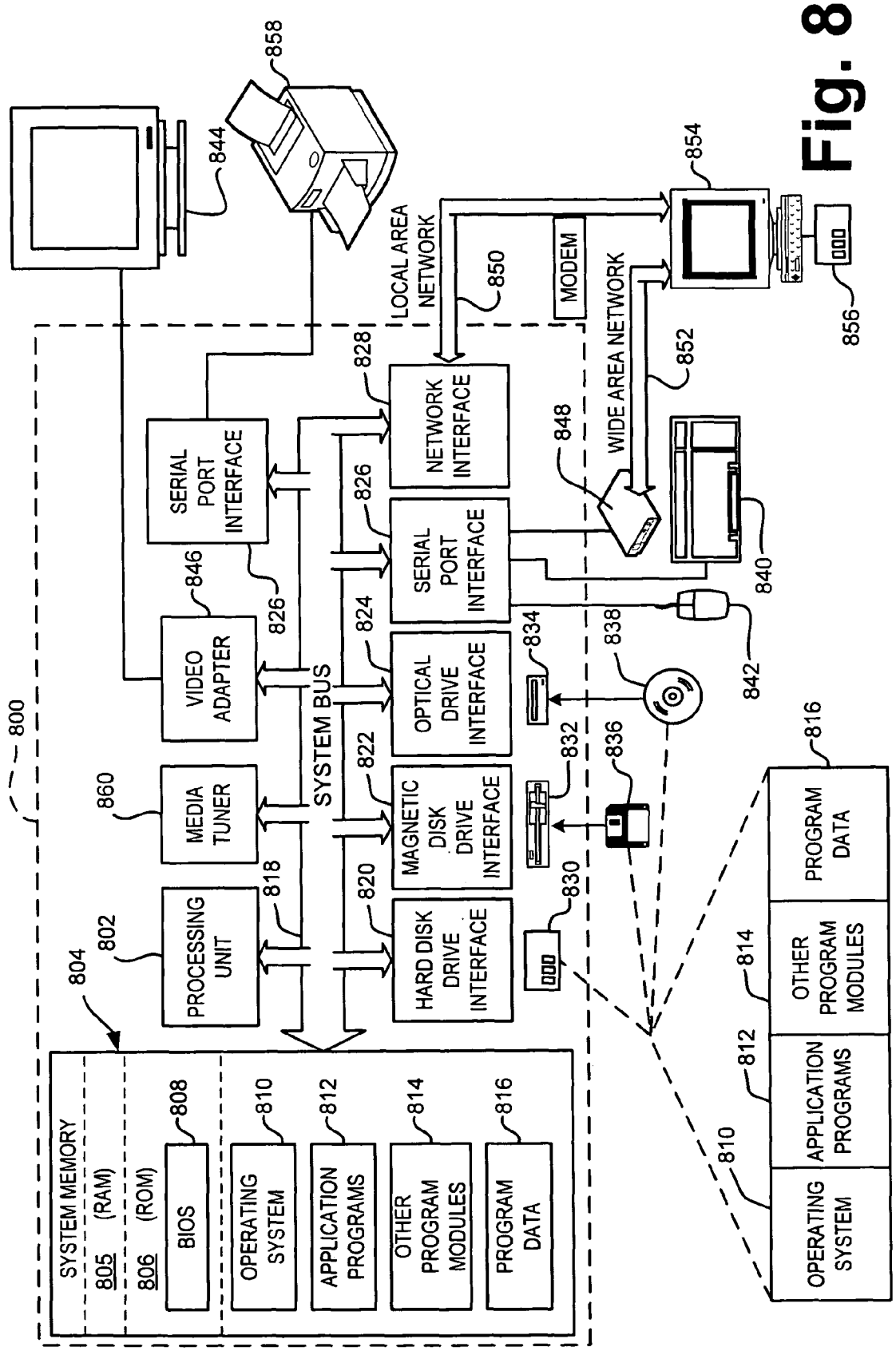

SERVER-SIDE MEDIA STREAM MANIPULATION FOR EMULATION OF MEDIA PLAYBACK FUNCTIONS

BACKGROUND OF THE INVENTION

Home entertainment networks are becoming popular and allow media stored on or accessible by a computer to be presented on more traditional presentation devices, such as a television, in a separate room from the computer. In order for a television to present such media, it is often connected with a media rendering device, which in turn is connected with the computer over a home entertainment network. These media rendering devices often have limited functionality for providing "trick" playback capabilities such as scan forward or reverse, seek, or pause. The limited capabilities of the media rendering devices often stem from a lack of sufficient memory and/or memory buffers to store the media stream locally, which are generally required to provide the dynamic playback functions. Even if a media rendering device is equipped with appropriate memory, transmission of all of the media content required to provide dynamic playback functionality at the media rendering device may consume significant bandwidth on the home entertainment network. Excessive bandwidth consumption may impact the ability of the network to provide content to other devices on the network or provide the requisite content to the particular media rendering device within the necessary time constraints to perform the requested function.

SUMMARY

The functionality provided to the media server of the home entertainment network described in greater detail below allows very low cost, low memory, and/or low functionality media rendering devices to act as digital media receivers, taking advantage of processing power on the central home media computer acting as the media server. The media server enables trick mode functions such as scan forward or reverse, slow motion, pause, and seek on devices with capabilities limited to 1× playback. The media server receives commands from user input at the client rendering device transmitted over the network to the media server. The media server then manipulates the media stream before transmission over the network by deleting or adding frames to the media stream as necessary to emulate the desired playback functions and replacing frame timestamps to create a media stream that appears to the media rendering device as a sequential 1× stream. The media stream transmitted by the media server to the media rendering client device may not contain all of the media content that is located in the corresponding media file on the media server, thus avoiding limitations on the download bandwidth and the local client storage.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various embodiments and implementations as further illustrated in the accompanying drawings and defined in the appended claims.

BRIEF DESCRIPTION OF THE DRAWINGS

FIG. 8 is a schematic diagram of a general purpose computing system for implementing aspects of the home entertainment environment.

DETAILED DESCRIPTION OF THE INVENTION

Figure 1:
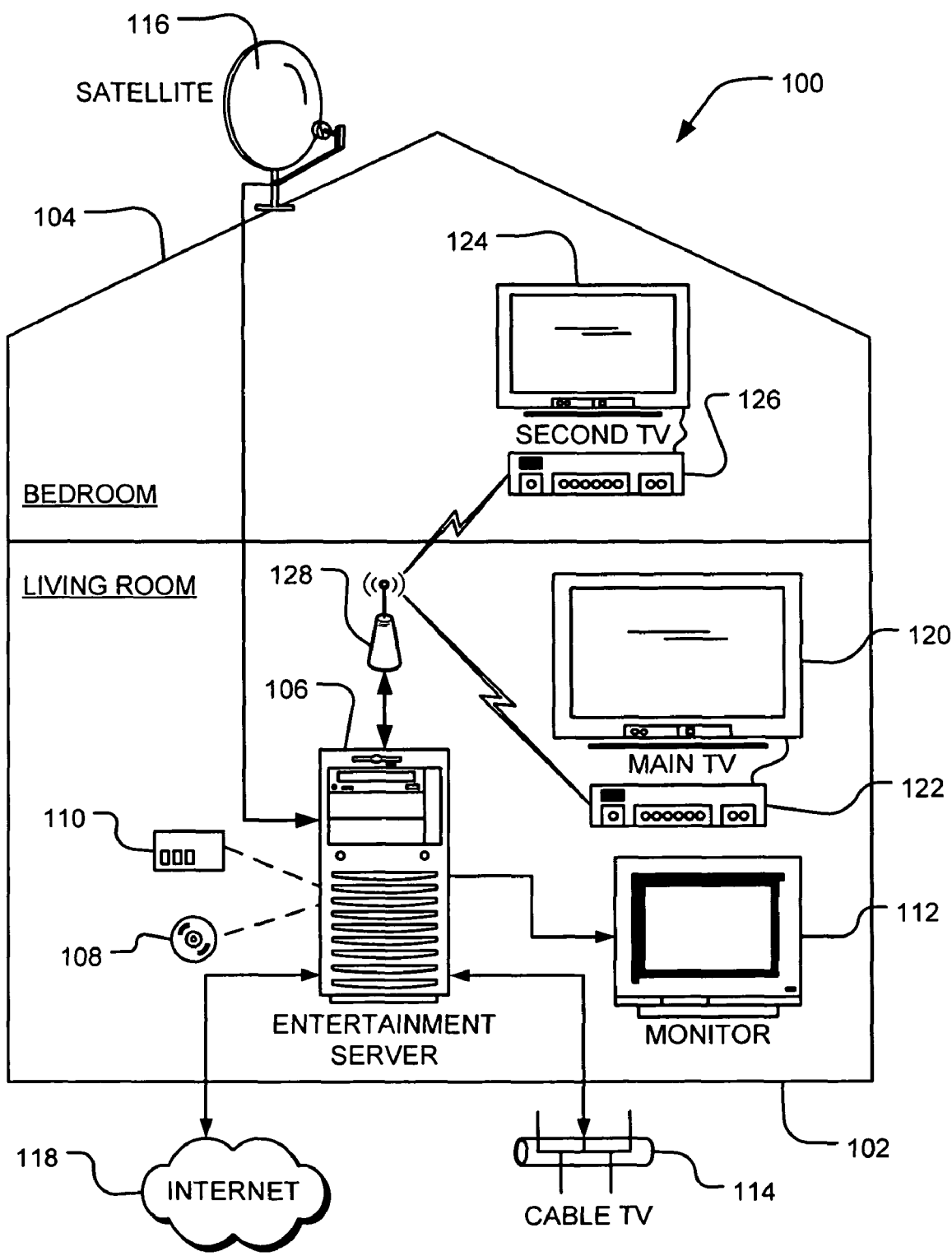
FIG. 1 is a schematic diagram of an implementation of a home entertainment environment.

FIG. 1 depicts an exemplary home entertainment environment 100 including a living room 102 and a bedroom 104. Central to the home entertainment environment 100 is a media server 106, in this implementation situated in the living room 102. In one implementation, the media server 106 is a conventional personal computer (PC) configured to run a multimedia software package, for example, the Windows® XP Media Center Edition operating system (Microsoft Corporation, Redmond Wash.). In such a configuration, the media server 106 is able to integrate full computing functionality with a complete home entertainment system into a single PC. For example, a user can watch television (TV) in one graphical window of a video monitor, while sending email or working on a spreadsheet in another graphical window on the same monitor. In addition, the entertainment system may also include other features, for example: a personal video recorder (PVR) to capture live TV shows for future viewing or to record the future broadcast of a single program or series; compact disc (CD) or digital video disc (DVD) playback 108; an integrated storage of and access to a user's recorded content, such as TV shows, songs, pictures, and home videos; and an electronic program guide (EPG).

Alternatively to a conventional PC, the media server 106 may comprise a variety of other devices capable of rendering a media component including, for example, a notebook or portable computer, a tablet PC, a workstation, a mainframe computer, a server, an Internet appliance, or combinations thereof. The media server 106 may also be a set-top box capable of delivering media content to a computer where it may be streamed, or the set-top box itself could stream the media content. As the media server 106 may be a full function computer running an operating system, the user may also have the option to run standard computer programs (e.g., word processing and spreadsheets), send and receive emails, browse the Internet, or perform other common functions.

In addition to storing media content, the media server 106 may be connected with a variety of media sources, for example, a cable connection 114, a satellite receiver 116, an antenna (not shown for the sake of graphic clarity), and/or a network such as the Internet 118. A user may thus control a live stream of media content (e.g., TV content) received, for example, via the cable connection 114, the satellite receiver 116, or antenna. This capability is enabled by one or more tuners residing in the media server 106. The one or more tuners may alternatively be located remote from the media server 106. In either case, the user may choose a tuner to fit any particular preferences. For example, a user wishing to watch both standard definition (SD) and high definition (HD) content may employ a tuner configured for both types of contents. Alternately, the user may employ an SD tuner for SD content and an HD tuner for HD content separately.

The TV content may be received as an analog (i.e., radio frequency) signal or a digital signal (e.g., digital cable). The received TV content may include discrete content packets, where each content packet includes actual TV content (i.e., audio and video data) and a policy or policies associated with the actual TV content. If TV content is received as an analog signal, discrete content packets may be created from the analog signal.

Digital rights management (DRM) policies may be employed to protect the actual TV content or video content digitally stored on the media server 106. Licenses may therefore be associated with the actual TV or video content. A license identifies keys used to decrypt video and TV content (e.g., content packets) that are encrypted as part of DRM. In particular, the keys are used to allow consumption or use of the actual video and TV content. In certain implementations, the content packets of received TV content may be encrypted or compressed. Encrypted content packets are typically decrypted with keys transmitted to or resident at the playback device or home network devices 122, 126.

The home environment 100 may also include one or more media receivers or home network devices 122, 126 placed in communication with the media server 106 through a network 128, for example, a local area network (LAN). In an exemplary embodiment, the home network device 122 may be a Media Center Extender device, for example, an Xbox 360 (Microsoft Corporation, Redmond, Wash.). The home network device 122, 126 may also be implemented as any of a variety of conventional computing devices, including, for example, a set-top box, a television, a gaming console, a desktop PC, a notebook or portable computer, a workstation, a mainframe computer, an Internet appliance, a handheld PC, a cellular telephone or other wireless communications device, a personal digital assistant (PDA), or combinations thereof. Furthermore, the home network device 122, 126 may include a tuner as described above.

The network 128 may comprise a wired and/or wireless network, for example, cable, Ethernet, WiFi, a wireless access point (WAP), or any other electronic coupling means, including the Internet. The network 128 may enable communication between the media server 106, the home network devices 122, 126, and any other connected device through packet-based communication protocols, such as transmission control protocol (TCP), Internet protocol (IP), real time transport protocol (RTP), and real time transport control protocol (RTCP). Communications may be transmitted directly between devices over a LAN, or they may be carried over a wide area network (WAN), for example, the Internet 118.

One or more video display devices, for example a main TV 120 in the living room 102, a secondary TV 124 in the bedroom 104, and a video monitor 112 may be situated throughout the home environment 100. These video display devices may be connected with the media server 106 via the network 128 either directly or via the home network devices 122, 126. The main TV 120 and the secondary TV may be coupled to the home network devices 122, 126 through wireless means or conventional cables. The video monitor 112 may be coupled with the media server 106 directly via a video cable. Media content including TV content may thus be supplied to each of the video display devices 112, 120, 124 over the home network 128 from the media server 106 situated in the living room 104.

The home network devices 122, 126 may be configured to receive streamed media content, including video and TV content, from the media server 106. Media content, and particularly video and TV content, may be transmitted from the media server 106 to the home network devices 122, 126 as streaming media comprised of discrete content packets via any of the network protocols described above. The streamed media content may comprise video IP, SD, and HD content, including video, audio, and image files, decoded on the home network devices 122, 126 for presentation on the connected TVs 120, 124. The media content may further be "mixed" with additional content, for example, an EPG, presentation content related to the media content, a web browser window, and other user interface environments transmitted from the media server for output on the TVs 120, 124 or the monitor 112. Such additional media content may be delivered in a variety of ways using different protocols, including, for example, standard remote desktop protocol (RDP), graphics device interface (GDI), or hyper text markup language (HTML).

In addition to the home network devices 122, 126 and the video display devices 112, 120, 124, the media server 106 may be communicatively coupled with other peripheral devices, including components such as digital video recorders (DVR), cable or satellite set-top boxes, speakers, and a printer (not shown for the sake of graphic clarity). The media server 106 may also enable multi-channel output for speakers. This may be accomplished through the use of digital interconnect outputs, such as Sony-Philips Digital Interface Format (S/PDIF) or TOSLINK® enabling the delivery of Dolby Digital, Digital Theater Sound (DTS), or Pulse Code Modulation (PCM) surround decoding.

Figure 2:
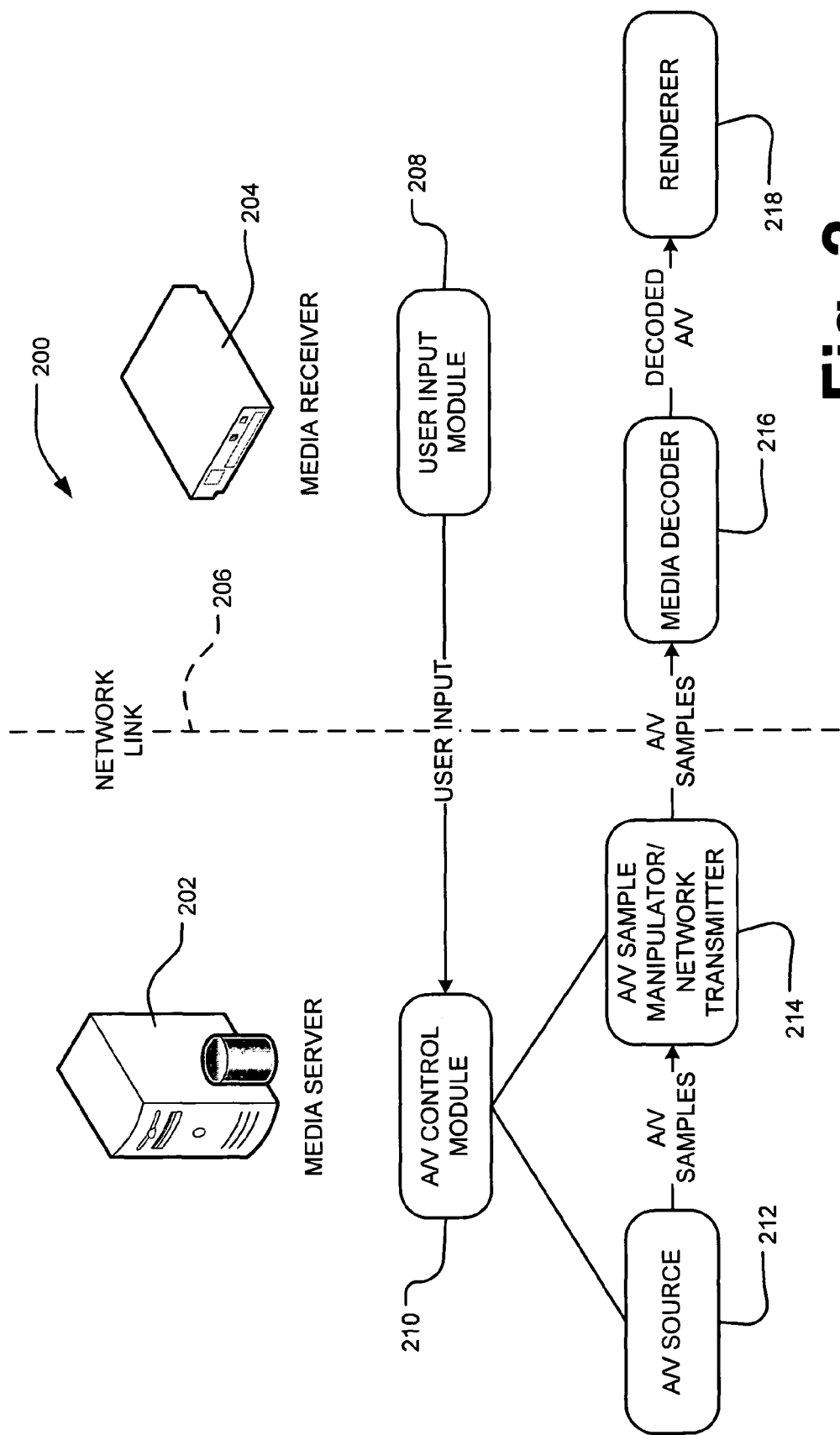
FIG. 2 is a schematic diagram of an implementation of a physical and logical software configuration for controlling a media receiver.

FIG. 2 provides an overview of an implementation of a physical and logical software configuration 200 for controlling playback of media content, in particular video content, on a media receiver 204 by the media server 202. This implementation provides particular benefit in a configuration in which the media receiver 204 has limited playback capabilities, for example, the media receiver 204 is capable of presenting media at only 1× rate in a forward direction. The limited capabilities of the media receiver 204 may stem from a lack of sufficient memory and/or memory buffers to store the media stream locally, which are generally necessary to provide "trick" playback capabilities such as scan forward or reverse, seek, or pause. As described above, the media receiver 204 is connected via a network link 206 (e.g., an IP network) to a media server 202.

Functional modules for controlling playback of the media content may be distributed between each of the media server 202 and the media receiver 204. In the implementation illustrated in FIG. 2, the functional modules may include a user input module 208, an audio/video (A/V) control module 210, an A/V source 212, an A/V sample manipulator and network transmitter module 214, a media decoder 216 and a media renderer 218. Each of these modules may be implemented via software executed on the media server 202 and the media receiver 204, hardware components of media server 202 and the media receiver 204, or combinations of both software and hardware.

The user input module 208 may be implemented on the media receiver 204. The user input module 208 takes playback input received from the user (e.g., a request to fast forward or pause video content) and transmits the input request to the media server 202 via the network link 206. User input may be received at the media receiver 204 via an infrared or radio frequency (RF) remote control device, a joystick or other gaming control device, control buttons on the media receiver 204, or keyboard or pointing device input. In addition to user input received directly at the media receiver 204, user input may also be received by any device connected to the network of the home entertainment environment and transmitted to the media server 204 via the network.

The A/V control module 210 of the media server 202 receives the user input received over the network link 206 from the user input module 208 of the media receiver 204. The A/V control module 210 controls the A/V source module 212 and the A/V sample manipulator 214 to perform an action requested by the user input (e.g., fast forward or pause). Control of the A/V source 212 may include causing the A/V source 212 to stream media content at a normal rate, increase or decrease the speed of the stream rate, pause the media stream, or seek a noncontiguous frame location of the media content. Control of the A/V sample manipulator 214 may include providing instructions to the A/V sample manipulator 214 to format the media stream by adding or removing frames and adjusting the frame timestamps in response to adjustments made to the media stream by the A/V source 212.

The A/V source module 212 on the media server 202 reads media content, for example, A/V content from a storage medium on the media server 202, for example, a hard disk drive, a DVD, or a CD. As indicated above, the A/V source 212 may sample the media content from the source and stream the media content at a normal rate or at an increased or decreased stream rate. The A/V source 212 may also pause the media stream or seek a noncontiguous frame location of the media content. The A/V source module 212 then transmits the media stream to the A/V sample manipulator 214.

The A/V sample manipulator and network transmitter module 214 on the media server 202 processes the media samples received from the A/V source module 212 in order to prepare them for decode on the media receiver 204. Processing of the media samples may involve adding frames, removing frames, interpolating frames, and copying frames. Processing of the media samples may further involve changing or replacing the timestamps associated with individual frames or packets to ensure that the media decoder 216 at the media receiver 204 is able to decode the media content. In one implementation wherein the media receiver 204 has limited functionality, for example, only 1× playback rate, the A/V sample manipulator and network transmitter module 214 may limit transmission of the media content to the media receiver 204 at a 1× frame rate. Exemplary operations of the A/V sample manipulator 214 are described in additional detail below with respect to FIGS. 3-6.

The media decoder 216 is a component of the media receiver 204. The media decoder 216 receives and decodes media samples streamed from the media server 202 by the A/V sample manipulator and network transmitter module 214. The media decoder 216 may have limited functionality, for example, it may be limited to receiving media content transmitted at a 1× frame rate.

The A/V renderer 218 component is responsible for displaying the decoded A/V media content to the user. The A/V renderer 218 may be a TV, a video monitor, or any other display device connected with the media receiver 204. In some embodiments, media receiver 204 may be incorporated into the A/V renderer 218, for example, as part of a digital TV. As discussed above, the A/V renderer 218 may have limited memory or processing abilities and may only be able to decode an incoming media stream at a constant or 1× frame rate. Thus, the media receiver 204 would be unable to process a higher or lower rate media stream, for example, when the media server 202 transmits a fast scan forward or reverse segment.

As discussed above with respect to FIG. 2, the A/V sample manipulator module 214 on the media server implements the bulk of the functionality. Examples of such functionality are depicted in FIGS. 3-6. While the examples of FIGS. 3-6 are depicted and described with respect to video content having a frame rate of 30 frames-per-second, resulting in timestamp increments of 33.$\overline{3}$ ms, the methods are equally applicable to media content of any frame or bit rate.

Figure 3:
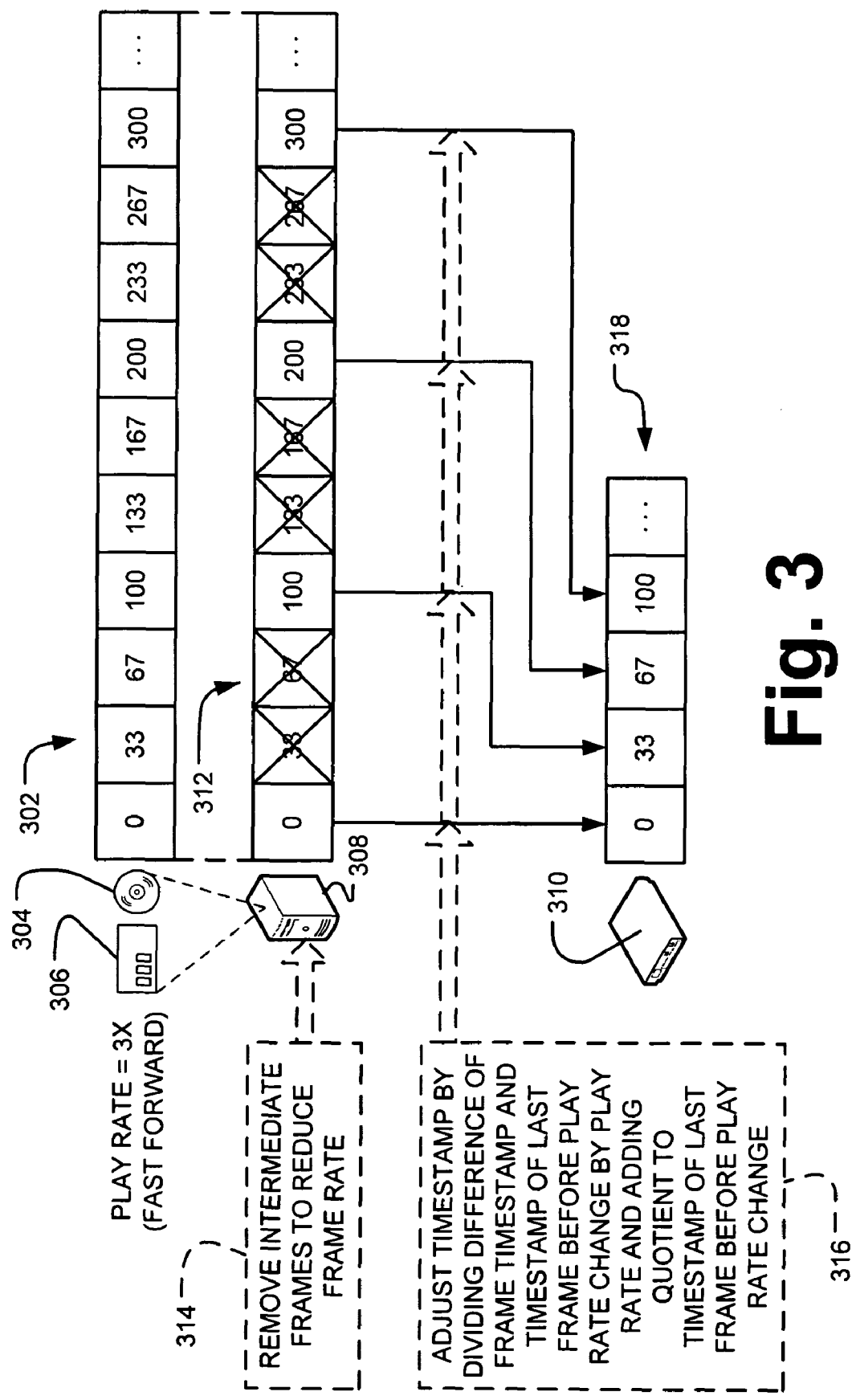
FIG. 3 is a schematic diagram of an implementation of fast forwarding media content when streaming video to a media receiver.

FIG. 3 depicts an implementation of a 3× fast forward video emulation. However, the techniques described are transferable to any play rate greater than a normal 1× play rate. An original media stream 302 from the A/V source 212 may be output by the media server 308 at the direction of the A/V control module 210. The source of the original media stream 302 may be, for example, from a DVD 304 or hard drive 306. The original media stream 302 consists of series of frames having sequential timestamps based upon the frame rate. As noted above, in this example the frame rate is 30 frames-per-second. Thus, the timestamp marking each successive frame is incremented by 33.$\overline{3}$ ms. In FIG. 3 the timestamps of the frames in the original media stream 302 arbitrarily start at 0 ms and are shown in order up to 300 ms. The values for 33.$\overline{3}$ ms and 66.$\overline{6}$ ms increments have been rounded to 33 and 67 for simplicity.

Upon receipt of user input from the user input module 208 indicating a desire for fast forward scan playback, the A/V control module 210 causes the A/V source 212 to increase the playback rate, in this case to 3× the normal playback rate. The A/V source 212 increases the speed at which it reads media off of the storage medium to 3× and transmits those samples to the A/V sample manipulator 214. In this exemplary home entertainment environment, however, the media receiver 310 is unable to process such rate-altered video frames for display on an attached display device. The media receiver 310 can only process a media stream at normal 1× speed. Thus, the A/V control module 210 on the media server 308 also instructs the A/V sample manipulator 214 to maintain a transmission stream at a 1× rate while emulating the effect of fast forwarding through all of the frames in the original media stream 302.

In order to achieve a 3× fast forward emulation, the A/V sample manipulator 214 will only transmit every third frame of the original media stream 302. Thus, the A/V sample manipulator 214 drops or deletes the intermediate frames as indicated in the functional description box 314 and as depicted in the intermediate media stream 312 of FIG. 3. By removing frames, however, there are now gaps in the timestamps between the remaining frames. As shown in the intermediate media stream 312, the remaining frames in this 3× example are separated by 100 ms increments. However, the media decoder 216 of the media receiver 310 may not be able to process the intermediate media stream 312 because it will be expecting timestamp increments of 33.$\overline{3}$ ms. Therefore, the A/V sample manipulator 214 adjusts the media timestamps to make it appear to the media decoder 216 as a 1× stream.

In a fast forward emulation, the timestamps of the remaining frames may be adjusted by dividing the difference between the timestamp of each remaining frame and the timestamp of the frame immediately preceding the implementation of the fast forward command by the play rate and then adding this quotient to the timestamp of the frame immediately preceding the fast forward command as indicated in the functional description box 316. Specifically, with respect to the play rate depicted in FIG. 3, the A/V sample manipulator 214 divides by 3 (the play rate) the difference between the timestamps of each remaining frame and frame 0 (the frame immediately preceding the fast forward command) to calculate a transmission media stream 318 at a 1× play rate for output to the media decoder 216. For the frame with original timestamp 100, this calculation is (100−0)/3+0=33. For the frame with original timestamp 200, this calculation is (200−0)/3+0=67. Further, for the frame with original timestamp 300, this calculation is (300−0)/3+0=100. These new timestamps are reflected in the frames of the transmission stream 318. The implementation for timestamp adjustment in FIG. 3 is merely exemplary. Other methodologies for adjusting timestamps may alternately be employed.

Figure 4:
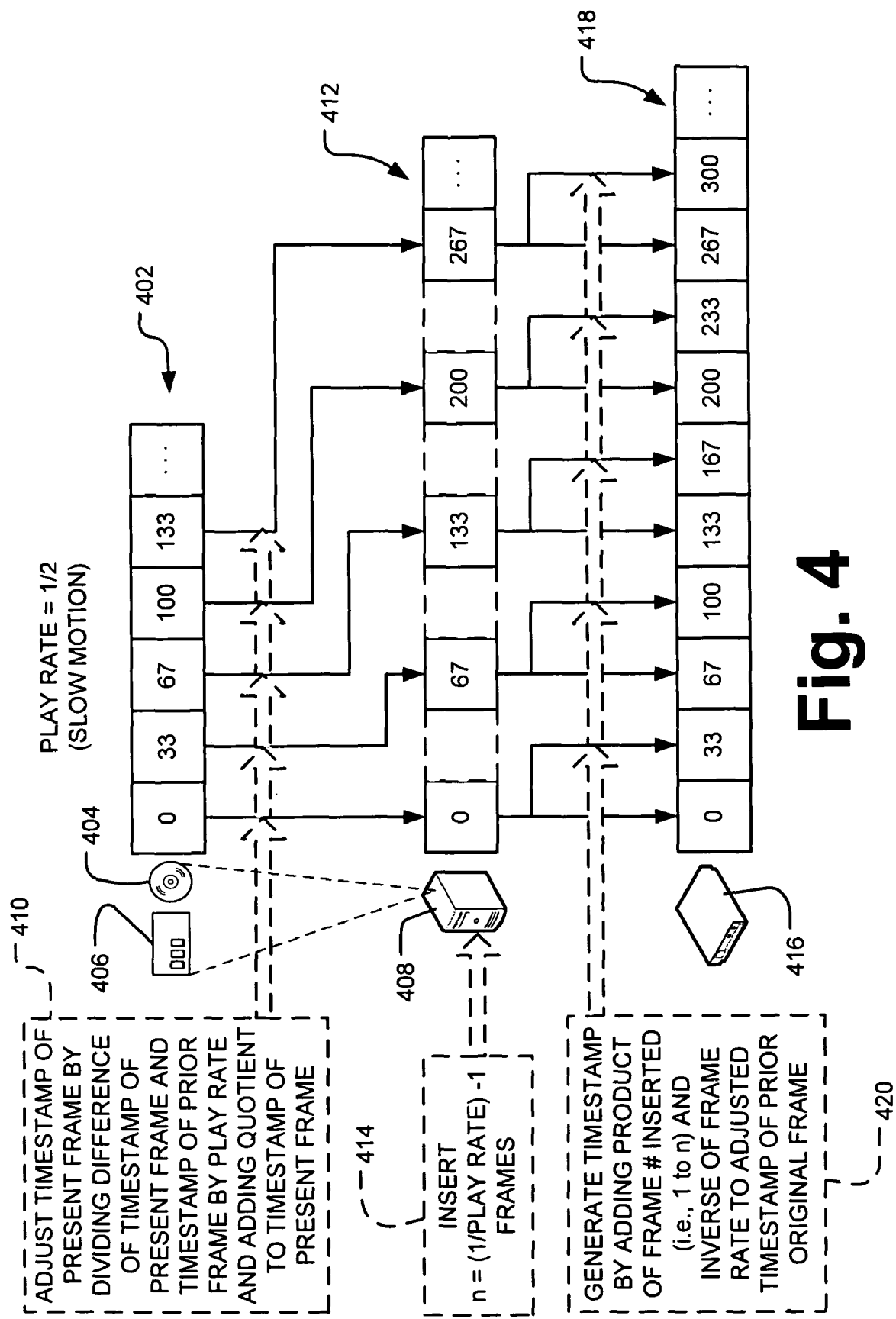
FIG. 4 is a schematic diagram of an implementation of slow motion media content when streaming video to a media receiver.

FIG. 4 depicts an implementation of a 0.5× slow motion video emulation. However, the techniques described are transferable to any play rate lesser than a normal 1× play rate. An original media stream 402 from the A/V source 212 may be output by the media server 408 at the direction of the A/V control module 210. The source of the original media stream 402 may be, for example, from a DVD 404 or hard drive 406. The original media stream 402 consists of series of frames having sequential timestamps based upon the frame rate. As noted above, in this example the frame rate is 30 frames-per-second. Thus, the timestamp marking each successive frame is incremented by $33.\overline{3}$ ms. In FIG. 4 the timestamps of the frames in the original media stream 402 arbitrarily start at 0 ms and are shown in order up to 133 ms. The values for $33.\overline{3}$ ms and $66.\overline{6}$ ms increments have been rounded to 33 and 67 for simplicity.

Upon receipt of user input from the user input module 208 indicating a desire for slow motion playback, the A/V control module 210 causes the A/V source 212 to decrease the playback rate, in this case to 0.5× the normal playback rate. The A/V source 212 decreases the speed at which it reads media off of the storage medium to 0.5× and transmits those samples to the A/V sample manipulator 214. Again, in this exemplary home entertainment environment, however, the media receiver 416 is unable to process video frames for display on an attached display device at any rate other than normal 1× speed. Thus, the A/V control module 210 on the media server 408 also instructs the A/V sample manipulator 214 to maintain a transmission stream at a 1× rate while emulating the effect of slow motion progression through the frames in the original media stream 402.

In order to achieve a 0.5× slow motion emulation, the A/V sample manipulator 214 adjusts each of the timestamps of the frames in the original media stream after initiation of the slow motion command by subtracting the timestamp of the prior frame from the timestamp of the present frame (i.e., calculating the timestamp difference between adjacent frames), dividing the difference between the timestamps by the play rate, and adding the quotient to the timestamp of the present frame to result in the new timestamp for the present frame as indicated in the functional description box 410. In the example of FIG. 4, since the play rate is 0.5×, the difference between adjacent timestamps is actually multiplied by 2.

After initiation of the slow motion command, the A/V sample manipulator 214 may insert an insertion number n of frames corresponding to the play rate adjustment ((1/play rate)−1=n) between each pair of adjacent frames in the original media stream 302. In the case of FIG. 4, n=((1/0.5)−1=1; i.e., one additional frame is added between pairs of adjacent frames. Such additional frames may be synthesized, extrapolated from the immediately preceding frame, or interpolated from the immediately preceding frame and the immediately following frame. Thus, the A/V sample manipulator 214 adds the intermediate frames as indicated in the functional description box 414 and as depicted adjacent the intermediate media stream 412 of FIG. 4.

The additional frames, however, do not have timestamps and the timestamps of the original frames have been changed and are now separated by increments of $66.\overline{6}$ ms. Thus, the media decoder 216 of the media receiver 416 may not be able to process the intermediate media stream 412 because it will be expecting timestamps on each frame in increments of $33.\overline{3}$ ms. Therefore, the A/V sample manipulator 214 calculates and assigns timestamps to create a transmission media stream 418 that appears to the media decoder 216 in the media receiver 416 as a 1× stream.

In a slow motion emulation, the timestamps of the additional intermediate frames may be determined by adding the product of the insertion number x of the frame inserted and the inverse of the frame rate to the previously adjusted timestamp of the immediately preceding original frame as indicated in the functional description box 420. In mathematical form, this timestamp generation calculation may be represented for each inserted frame x, where x is in the set [1,n] as:

Timestamp(InsertedFrame $x$)=AdjustedTimestamp (PriorOriginalFrame)+($x$×(1/FrameRate)).

In the example of FIG. 4, with a play rate of 0.5 and a frame rate of 30 frames/second, the newly inserted second frame of the transmission stream 418 is assigned a timestamp of 33 ms by calculating 0 ms+(1×(1/30)). Similarly, the newly inserted fourth frame of the transmission stream 418 is assigned a timestamp of 100 ms by calculating 67 ms+(1×(1/30)).

In a further example (not depicted), a play rate of $0.\overline{3}$ and a frame rate of 30 frames/second, two additional frames are added between pairs of adjacent original frames (n=((1/$0.\overline{3}$)−1=2). Presuming the first original frame has a timestamp of 0 ms similar to the example of FIG. 4, the newly inserted second frame of the transmission stream will be assigned a timestamp of 33 ms by calculating 0 ms+(1×(1/30)). The newly inserted third frame of the transmission stream will be assigned a timestamp of 67 ms by calculating 0 ms+(2×(1/30)).

The implementation for timestamp adjustment in FIG. 4 is merely exemplary. Other methodologies for generating intermediate timestamps may alternately be employed. For example, the timestamps of the original frames could be adjusted and the difference between timestamps of two adjacent original frames could be divided between the number of frames to be inserted to determine appropriate timestamps for the inserted frames.

Figure 5:
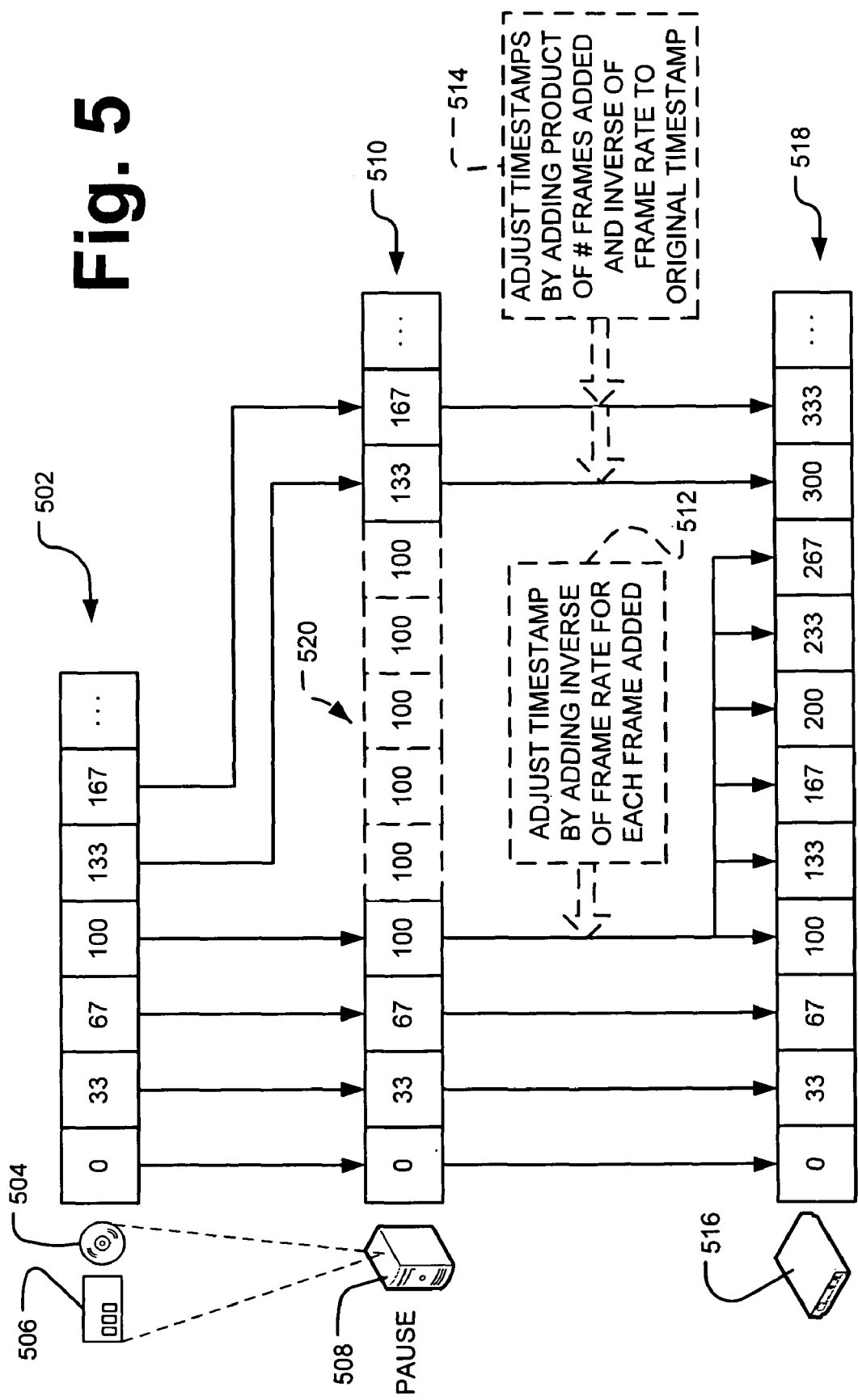
FIG. 5 is a schematic diagram of an implementation of pausing media content when streaming video to a media receiver.

FIG. 5 depicts an implementation of a pause or frame stepping video emulation. An original media stream 502 from the A/V source 212 may be output by the media server 508 at the direction of the A/V control module 210. The source of the original media stream 502 may be, for example, from a DVD 504 or hard drive 506. The original media stream 502 consists of series of frames having sequential timestamps based upon the frame rate. As noted above, in this example the frame rate is 30 frames-per-second. Thus, the timestamp marking each successive frame is incremented by $33.\overline{3}$ ms. In FIG. 5 the timestamps of the frames in the original media stream 502 arbitrarily start at 0 ms and are shown in order up to 167 ms. The values for 33.3̄ ms and 66.6̄ ms increments have been rounded to 33 and 67 for simplicity.

Upon receipt of user input from the user input module 208 indicating a desire for a pause in playback or a video stepping function, the A/V control module 210 causes the A/V source 212 to halt the playback for continued display of a single frame. The A/V source 212 suspends reading media from of the storage medium transmission of any further media samples to the A/V sample manipulator 214. This suspension is indicated as intermediate media stream 510, where playback is halted at frame 100 for a period of time. Again, in this exemplary home entertainment environment, however, the media receiver 516 is only able to process video frames for display on an attached display device at normal 1× speed. Thus, the A/V control module 210 on the media server 508 also instructs the A/V sample manipulator 214 to maintain a transmission stream at a 1× rate while emulating the effect of the pause or frame step function in the original media stream 502.

In order to achieve a pause or frame step emulation, the A/V sample manipulator 214 may duplicate a last frame provided by the A/V source 212, in this case frame 100, for transmission every 33.3̄ ms in the transmission media stream 518 to the media receiver 516. Frame 100 is duplicated an insertion number n of times to create a series of duplicate frames 520 in the intermediate media stream 510 until the pause command is lifted. The A/V sample manipulator 214 also creates a timestamp for each duplicate of frame 100 by adding the product of the respective insertion number n of the frame inserted and the inverse of the play rate to the timestamp of the original frame immediately before the pause command (i.e., frame 100) as indicated in the functional description box 512. In the example of FIG. 5, the A/V sample manipulator 214 generates five duplicate frames with incremental timestamps 133, 167, 200, 233, and 267 before the pause control is lifted.

Once the pause or frame step function is halted, the A/V sample manipulator 214 should alter the timestamps of frames of the original media stream 502 because they will no longer be in sequential order with the duplicate frames 520 inserted into the transmission media stream 518. The media decoder 216 of the media receiver 516 may be unable to process the transmission media stream 518 as it will be expecting frames with timestamps in a sequential order and the timestamps of the frames in the restarted original media stream 502 will have earlier timestamps than the previously transmitted duplicate frames. Therefore, the A/V sample manipulator 214 may adjust the frames in the original media stream by adding the product of the total number of frames n inserted during the pause function and the inverse of the frame rate to the original timestamp of the respective frame as indicated in the functional description box 512. In the example of FIG. 5, this translates in to the addition of 166.6̄ ms to each frame after the pause sequence in the intermediate media stream 510 before transmission as part of the transmission media stream 510. The implementation for timestamp adjustment in FIG. 5 is merely exemplary. Other methodologies for adjusting timestamps may alternately be employed.

Figure 6:
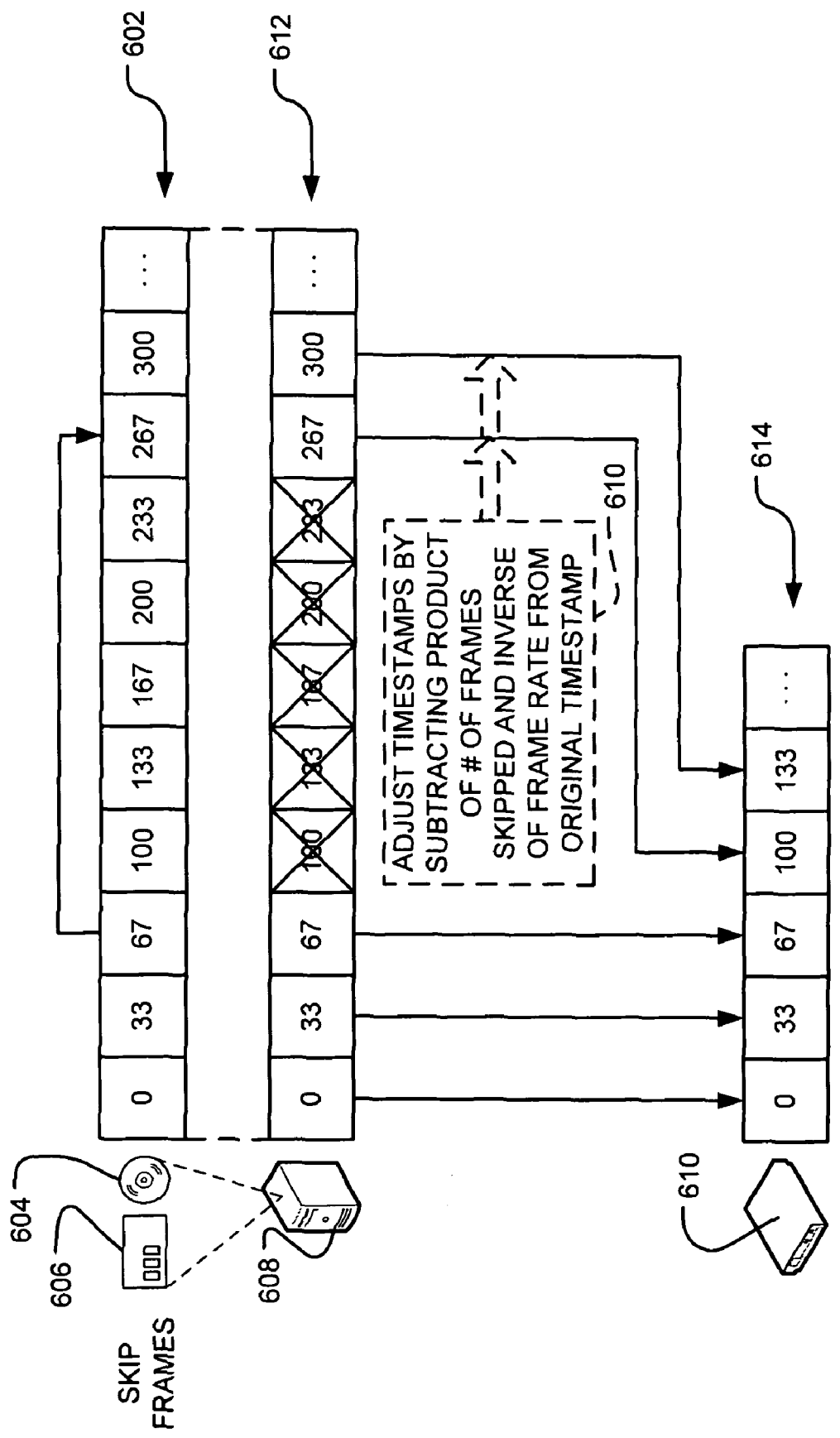
FIG. 6 is a schematic diagram of an implementation of seeking media content when streaming video to a media receiver.

FIG. 6 depicts an implementation of a frame seeking video emulation for skipping forward in a media stream. An original media stream 602 from the A/V source 212 may be output by the media server 608 at the direction of the A/V control module 210. The source of the original media stream 602 may be, for example, from a DVD 604 or hard drive 606. The original media stream 602 consists of series of frames having sequential timestamps based upon the frame rate. As noted above, in this example the frame rate is 30 frames-per-second. Thus, the timestamp marking each successive frame is incremented by 33.3̄ ms. In FIG. 6 the timestamps of the frames in the original media stream 602 arbitrarily start at 0 ms and are shown in order up to 167 ms. The values for 33.3̄ ms and 66.6̄ ms increments have been rounded to 33 and 67 for simplicity.

Upon receipt of user input from the user input module 208 indicating a desire to skip a section of frames during playback, the A/V control module 210 causes the A/V source 212 to skip a section of frames when reading from the media source. As depicted in the intermediate media stream 612 of FIG. 6, the A/V source 212 skips frames 100-233 in the original media stream 602. Again, in this exemplary home entertainment environment, the media receiver 610 is only able to process video frames for display on an attached display device at normal 1× speed and further may not be able to process the intermediate media stream 612 because it will be expecting timestamp increments of 33.3̄ ms. Thus, the A/V control module 210 on the media server 608 also instructs the A/V sample manipulator 214 to maintain a transmission stream at a 1× rate while emulating the effect of the seeking function in the original media stream 602.

In order to achieve a forward frame seeking emulation, the A/V sample manipulator 214 drops or deletes the skipped frames as depicted in the intermediate media stream 612 of FIG. 6. By removing frames, however, there are now gaps in the timestamps between the last frame read before the seek operation and the first frame read after the seek operation. The A/V sample manipulator 214 therefore adjusts the media timestamps to make it appear to the media decoder 216 in the media receiver as a 1× stream. The timestamps of the frames are adjusted by subtracting the product of the number of frames skipped and the inverse of the frame rate from the timestamps of the frames read after the seek operation as indicated in the functional description box 616. The A/V sample manipulator 214 thereby creates a 1× transmission media stream 614 for output to the media receiver 610 that can be processed by the media decoder 216.

It should be apparent that a frame seeking video emulation for skipping backward in a media stream can similarly be performed. In such a case, the A/V source 212 may retransmit frames previously played. Thus, the timestamps associated with these frames will be out of order and in fact earlier than the timestamps of the most recently played frames. In order to achieve a backward frame seeking emulation, the A/V sample manipulator 214 therefore adjusts the media timestamps to make the media stream appear to the media decoder 216 in the media receiver as a sequential 1× stream. The timestamps of the frames are adjusted by adding the product of the number of frames skipped and the inverse of the frame rate to the timestamps of the frames read after the seek operation. The A/V sample manipulator 214 thereby creates a 1× transmission media stream for output to the media receiver that can be processed by the media decoder. The implementation for timestamp adjustment in FIG. 6 is merely exemplary. Other methodologies for adjusting timestamps may alternately be employed.

Figure 7:
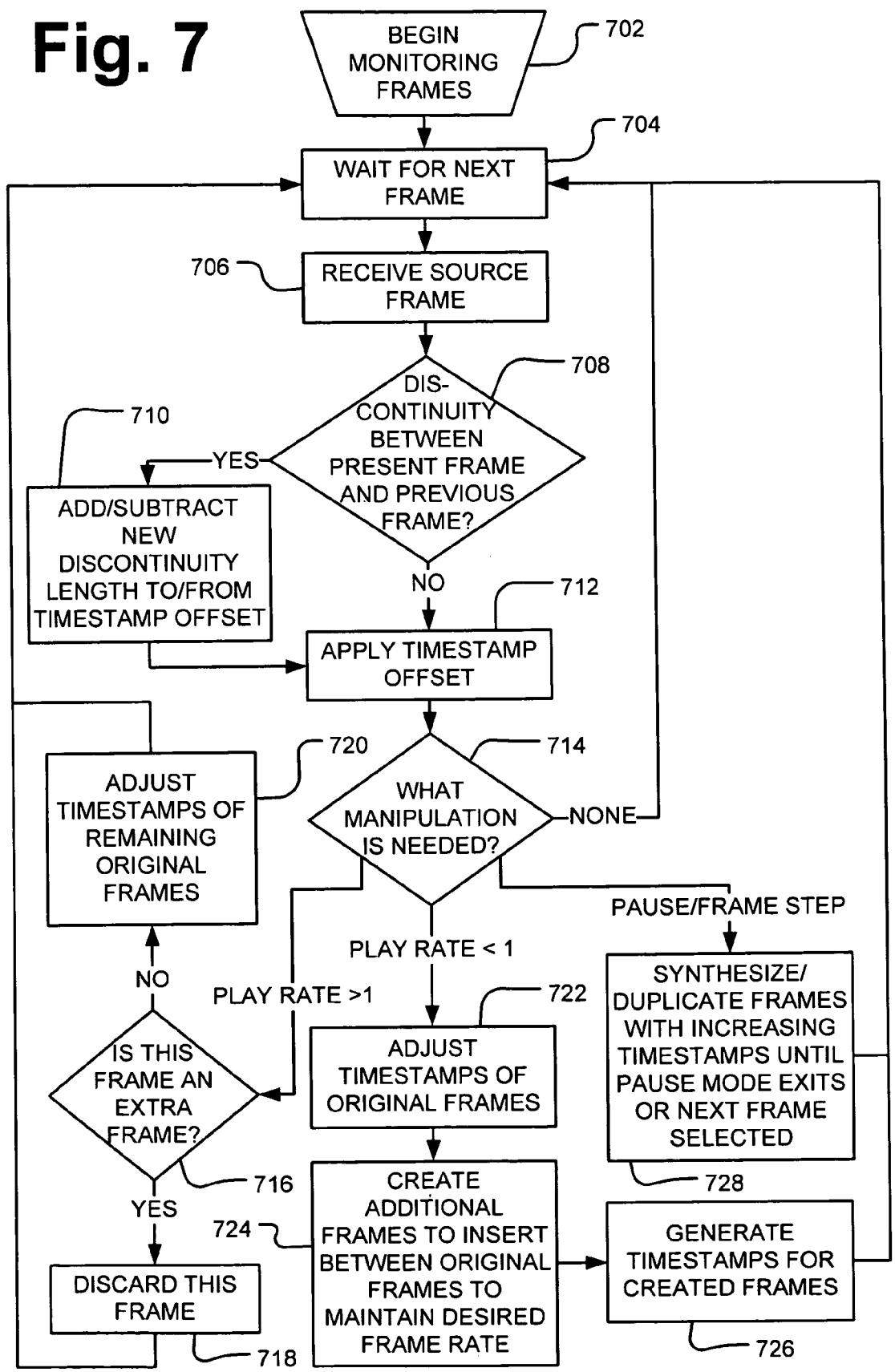
FIG. 7 is a flow diagram of one logical implementation of control of media content at a media server before streaming the media content to a media receiver.

FIG. 7 is a flow diagram depicting an exemplary implementation of logical operations for manipulation of the media stream 700 that may be followed by the A/V sample manipulator module 214 of FIG. 2. While FIGS. 3-6 provide examples of the effects of specific implementations on frames received from the A/V source module 212, the diagram of FIG. 7 provides a generalized operational process followed by the A/V sample manipulator module 214 depending upon the instructions received from the A/V control module 210.

The logic of FIG. 7 begins at operation 702, wherein the A/V sample manipulator module 214 begins monitoring frames received from the A/V source 212. In a waiting operation 704, the A/V sample manipulator module 214 waits for the next frame to arrive, either from the A/V source 212 or from its own output as further described below. In a receiving operation, the A/V sample manipulator module 214 receives a frame from the A/V source 212 or a copied frame that the A/V sample manipulator module 214 itself generates.

Next, in a query operation 708, the A/V sample manipulator module 214 determines whether there is a discontinuity between the present frame and the previous frame. A discontinuity is indicated when the timestamp of the present frame received from the A/V source 212 is not the next serial timestamp expected after the prior frame. Such a discontinuity may occur, for example, when frames are skipped. Discontinuities may be created by the A/V source 212, for example, when the A/V control module 210 causes the A/V source 212 to skip frames, or by the A/V sample manipulator module 214, for example, when the A/V sample manipulator module 214 emulates pause or rate change features by adding or deleting frames.

If a new discontinuity is detected in query operation 708, a new discontinuity length between the present frame and previous frame is calculated in a timestamp offset adjustment operation 710 and the discontinuity length is added or subtracted from a timestamp offset that may be applied to each frame. For example, in 30 frame-per-second video, each successive frame received from the A/V/source 212 will be stamped in 33.3̄ ms increments. As a video begins to play, the first timestamp is 0 ms, the second is 33.3̄ ms, the third is 66.6̄ ms, the fourth is 100 ms, and so on. However, if the A/V source 212 skips frames, for example, during a seek operation or to move to the next scene of a movie, the timestamp received at the A/V sample manipulator module 214 may skip from 100 ms to 1000 ms. This missing period between 100 ms and 1000 ms, or 867 ms, would be the initial timestamp offset value and would be subtracted from the timestamp value of future frames. (Note, the missing period is 867 ms because the frame with timestamp 100 ms is intended to be displayed for 33 ms, i.e., until the frame with timestamp 133 ms would normally be presented.) Other discontinuities may add to or subtract from the timestamp offset value. In application operation 712, the timestamp offset is applied to each frame received at the A/V sample manipulator module 214 to change the frame timestamp such that the timestamp for each successive frame transmitted by the A/V sample manipulator module 214 to the A/V decoder 216 is in a sequential order of 33.3̄ ms increments (or whatever the appropriate interval may be).

Similarly, a discontinuity in timestamps can arise from manipulation of the frames by the A/V sample manipulator module 214 as previously shown and described with respect to FIGS. 3-6. In those prior examples, the A/V sample manipulator module 214 either adds frames (to emulate slow motion), removes frames (to emulate a fast forward effect), or duplicates frames (to emulate a pause effect).

Once the timestamp offset is applied to the frame, a second query operation 712 determines what, if any, frame manipulation is needed to emulate an input request from the user and the consequent change in frame rate of frames received from the A/V source 212. If no further frame manipulation is needed (i.e., the content stream is received at a 1× play rate and no input requests have been received), the logic of the manipulation operations 700 returns to waiting operation 704 to wait for reception of the next frame.

If the second query operation 712 determines that an increased play rate is desired, the logic of the manipulation operations 700 moves to a third query operation 716 in which a determination is made as to whether the present frame is an "extra" frame. As described above with respect to FIG. 3, in order to emulate a fast forward function while maintaining a constant output rate to the media decoder 216, frames are removed from the media stream depending upon the desired play rate. For example, in FIG. 3, a fast forward play rate of 3× is achieved by dropping two frames and transmitting only the third frame. The dropped frames are thus "extra." Returning to the manipulation logic 700 of FIG. 7, if the present frame is to be dropped to achieve the fast forward emulation effect, the frame is discarded in discarding operation 718. The manipulation logic 700 then returns to waiting operation 704 to wait for reception of the next frame.

If the third query operation 716 determines that the frame is not an extra frame and should be output, an adjusting operation 720 is invoked to adjust the timestamp of the present frame to account for any number of previous frames that were discarded in discarding operation 718. As previously described with respect to FIG. 3, the timestamp of the frame may be adjusted by dividing the difference between the timestamp of the present frame and the timestamp of the frame immediately preceding the implementation of the fast forward command by the play rate and then adding this quotient to the timestamp of the frame immediately preceding the fast forward command. This sum is then substituted for the timestamp of the present frame. This mathematical operation is applicable to any combination of frame rate and play rate. This adjustment provides an accurate timestamp for the present frame to be presented in 1× playback in sequential order with the previously transmitted frame. Once the timestamp is appropriately adjusted, the manipulation logic 700 returns to waiting operation 704 to wait for reception of the next frame.

Returning to the second query operation 714, if the second query operation 714 determines that a decreased play rate is desired, the logic of the manipulation operations 700 moves to a second adjusting operation 722. This adjusting operation 722 may be performed in accordance with the process of FIG. 4 in which the timestamps are divided by the decreased play rate. Once the timestamps of the original frames are appropriately adjusted, additional frames may be added to the media stream in a creating operation 724 to ensure a 1× media stream to the media decoder 216. As described above with respect to FIG. 4, in order to emulate a slow motion function while maintaining a constant output rate to the media decoder 216, a number of frames may be added to the media stream between the original frames depending upon the desired play rate. Such frames may be synthesized, extrapolated from the immediately preceding frame, or interpolated from the immediately preceding frame and the immediately following frame. For example, in FIG. 4, a slow motion play rate of 0.5× is achieved by adding a frame between each frame received from the A/V source 212. Alternatively, the A/V sample manipulator module 214 may be equipped with a buffer that may allow for additional synthesis of interpolated frames from between the present frame and a future frame.

Once any necessary intermediate frames have been created and inserted, sequential timestamps may be applied. In a generation operation 726, timestamps may be generated and allocated to the created frames. Timestamp generation may follow the process previously described with respect to FIG. 4 by adding the product of the number n of frames inserted and the inverse of the frame rate to the adjusted timestamp of the immediately preceding original frame. Alternately, any other appropriate methodology for generating timestamps for inserted frames may be employed. Once the timestamps are generated, the manipulation logic 700 returns to waiting operation 704 to wait for reception of the next frame.

Returning again to the second query operation 714, if the second query operation 714 determines that a pause or frame stepping function is desired, the logic of the manipulation operations 700 moves to a duplication operation 728. As previously described with respect to FIG. 5, in order to emulate a pause (or frame stepping) function while maintaining a constant output rate to the media decoder 216, frames are added to the media stream. Such frames may be duplicated from the immediately preceding frame. Alternately, frames could be synthesized for display during the pause or frame stepping functions. Duplicate frames may be created and allocated increasing timestamps until normal play function is restored or the next frame in a frame step is selected. Upon the occurrence of either of these events, the manipulation logic 700 returns to the waiting operation 704 to wait for reception of the next frame.

An exemplary hardware and operating environment for implementing the invention is depicted in FIG. 8. As indicated above, the media server and the media receiver devices may comprise general purpose computing devices. A general purpose computing device may be the form of a computer 800, including a processing unit 802, a system memory 804, and a system bus 818 that operatively couples various system components, including the system memory 804 to the processing unit 802. There may be only one or there may be more than one processing unit 802, such that the processor of computer 800 comprises a single central processing unit (CPU), or a plurality of processing units, commonly referred to as a parallel processing environment. The computer 800 may be a conventional computer, a distributed computer, or any other type of computer; the invention is not so limited.

The system bus 818 may be any of several types of bus structures including a memory bus or memory controller, a peripheral bus, a switched fabric, point-to-point connections, and a local bus using any of a variety of bus architectures. The system memory 804 may also be referred to as simply the memory, and includes read only memory (ROM) 806 and random access memory (RAM) 805. A basic input/output system (BIOS) 808, containing the basic routines that help to transfer information between elements within the computer 800, such as during start-up, is stored in ROM 806. The computer 800 further includes a hard disk drive 830 for reading from and writing to a hard disk, not shown, a magnetic disk drive 832 for reading from or writing to a removable magnetic disk 836, and an optical disk drive 834 for reading from or writing to a removable optical disk 838 such as a CD ROM, DVD, or other optical media.

The hard disk drive 830, magnetic disk drive 832, and optical disk drive 834 are connected to the system bus 818 by a hard disk drive interface 820, a magnetic disk drive interface 822, and an optical disk drive interface 824, respectively. The drives and their associated computer-readable media provide nonvolatile storage of computer-readable instructions, data structures, program modules and other data for the computer 800. It should be appreciated by those skilled in the art that any type of computer-readable media that can store data that is accessible by a computer, for example, magnetic cassettes, flash memory cards, digital video disks, RAMs, and ROMs, may be used in the exemplary operating environment.

A number of program modules may be stored on the hard disk 830, magnetic disk 832, optical disk 834, ROM 806, or RAM 805, including an operating system 810, one or more application programs 812, for example, a multimedia software package, other program modules 814, and program data 816, for example, media content. A user may enter commands and information into the personal computer 800 through input devices such as a keyboard 840 and pointing device 842, for example, a mouse. Other input devices (not shown) may include, for example, a microphone, a joystick, a game pad, a tablet, a touch screen device, a satellite dish, a scanner, a facsimile machine, and a video camera. These and other input devices are often connected to the processing unit 802 through a serial port interface 826 that is coupled to the system bus 818, but may be connected by other interfaces, such as a parallel port, game port, or a universal serial bus (USB).

A monitor 844 or other type of display device is also connected to the system bus 818 via an interface, such as a video adapter 846. In addition to the monitor 844, computers typically include other peripheral output devices, such as a printer 858 and speakers (not shown). These and other output devices are often connected to the processing unit 802 through the serial port interface 826 that is coupled to the system bus 818, but may be connected by other interfaces, such as a parallel port, game port, or a universal serial bus (USB). In the case of an media server, a tuner 860 may also be connected with the system bus in order to receive and convert analog content signals into digital format and similarly convert digital content into analog signals for transmission to connected devices.

The computer 800 may operate in a networked environment using logical connections to one or more remote computers, such as remote computer 854. These logical connections may be achieved by a communication device coupled to or integral with the computer 800; the invention is not limited to a particular type of communications device. The remote computer 854 may be another computer, a server, a router, a network personal computer, a client, a peer device, or other common network node, and typically includes many or all of the elements described above relative to the computer 800, although only a memory storage device 856 has been illustrated in FIG. 8. The logical connections depicted in FIG. 8 include a wired or wireless local-area network (LAN) 850, for example, an Ethernet network, or a WiFi network, and a wide-area network (WAN) 852, for example, a cable network or a telephony network. Such networking environments are commonplace in office networks, enterprise-wide computer networks, intranets and the Internet, which are all types of networks.

When used in a LAN 850 environment, the computer 800 may be connected to the local network 850 through a network interface or adapter 828, which is one type of communications device. When used in a WAN 852 environment, the computer 800 typically includes a modem 848, a network adapter, or any other type of communications device for establishing communications over the wide area network 852. The modem 848, which may be internal or external, is connected to the system bus 818 via the serial port interface 826. In a networked environment, program modules depicted relative to the personal computer 800, or portions thereof, may be stored in a remote memory storage device. It is appreciated that the network connections shown are exemplary and other means of and communications devices for establishing a communications link between the computers may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understand that the described technology may be employed independent of a personal computer. Other embodiments are therefore contemplated. It is intended that all matter contained in the above description and shown in the accompanying drawings shall be interpreted as illustrative only of particular embodiments and not limited. Changes in details or structure may be made without departing from the basic elements of the invention as defined in the following claims.

What is claimed is:

1. A method for enabling, over a network, rate-altering media playback functions at a frame rate expected by a rendering device, the method comprising
receiving a command at a media server over the network from the rendering device to initiate a selected rate-altering media playback function;
accessing, by the media server, an original stream of frames having sequential frame timestamps;
generating an intermediate series of frames at the media server for transmission to the rendering device over the network by deleting frames having frame timestamps from the original stream of frames in excess of the frame rate expected by the rendering device when the selected rate-altering media playback function corresponds to an increased play rate;
generating an intermediate series of frames at the media server for transmission to the rendering device over the network by inserting one or more intermediate frames that do not have timestamps into the original stream of frames when the selected rate-altering media playback function corresponds to a decreased play rate and insufficient frames originally exist in the original stream of frames to fulfill the frame rate expected by the rendering device;
detecting discontinuity in frame timestamps between frames in the intermediate series of frames with respect to a timestamp increment expected by the rendering device, the detected discontinuity in the frame timestamps caused by deletion of frames from the original stream of frames when the selected rate-altering media playback function corresponds to the increased play rate and caused by insertion of one or more intermediate frames into the original stream of frames when the selected rate-altering media playback function corresponds to the decreased play rate; and
providing the intermediate series of frames with sequential frame timestamps separated by the timestamp increment expected by the rendering device before transmission of frames in the intermediate series of frames over the network to account for the detected discontinuity with respect to the frame rate expected by the rendering device by:
adjusting frame timestamps of all frames in the intermediate series of frames having frame timestamps according to a frame timestamp of a frame from the original stream of frames immediately preceding the command to initiate the selected rate-altering media playback function and a play rate corresponding to the selected rate-altering media playback function, and
assigning frame timestamps to the intermediate frames that do not have frame timestamps inserted into the original stream of frames when the selected rate-altering media playback function corresponds to the decreased play rate.

2. The method of claim 1 further comprising transmitting the intermediate series of frames over the network to the rendering device.

3. The method of claim 1 further comprising
calculating an inverse of the play rate corresponding to the selected rate-altering media playback function;
subtracting 1 from the inverse to determine a difference; and
inserting a number of intermediate frames equal to the difference resulting from the subtracting operation between each pair of adjacent frames in the original stream of frames.

4. The method of claim 1, wherein the one or more intermediate frames inserted into the original stream of frames are duplicate frames of another frame in the original stream of frames.

5. The method of claim 4, further comprising successively adding a product of an inverse frame rate amount and a respective insertion number of a respective intermediate frame of the one or more intermediate frames to an original frame timestamp of each of the one or more intermediate frames.

6. The method of claim 1, wherein the one or more intermediate frames inserted into the original stream of frames are extrapolated and/or interpolated frames from at least one frame in the original stream of frames.

7. The method of claim 6, further comprising successively adding a product of an inverse frame rate amount and a respective insertion number of a respective intermediate frame of the one or more intermediate frames to an original frame timestamp of each of the one or more intermediate frames.

8. A computer-readable storage medium that does not consist of a signal, the computer-readable storage medium having stored computer-executable instructions causing a computing device to perform a computer process implementing the method of claim 1.

9. A method of for enabling, over a network, rate-altering media playback functions at a frame rate expected by a rendering device, the method comprising
receiving a command over the network from the rendering device to initiate a selected rate-altering media playback function;
deleting frames from a stream of frames in excess of the frame rate expected by the rendering device; and adjusting frame timestamps of frames remaining in the stream of frames before transmission of the remaining frames over the network at the frame rate expected by the rendering device by:
    dividing the frame timestamps of the frames remaining in the stream of frames by a play rate corresponding to the selected rate-altering media playback function, and
    substituting a quotient of the dividing operation for the frame timestamps of the frames remaining in the stream of frames, respectively.

10. A computer-readable storage medium that does not consist of a signal, the computer-readable storage medium having stored computer-executable instructions causing a computing device to perform a computer process implementing the method of claim 9.

11. A method of for enabling, over a network, rate-altering media playback functions at a frame rate expected by a rendering device, the method comprising
    receiving a command over the network from the rendering device to initiate a selected rate-altering media playback function;
    deleting frames from a stream of frames in excess of the frame rate expected by the rendering device; and
    adjusting frame timestamps of each of the frames remaining in the stream of frames after the deleting operation before transmission of the remaining frames over the network at the frame rate expected by the rendering device by subtracting a product of the total number of deleted frames to that point and an inverse of the frame rate expected by the rendering device.

12. A computer-readable storage medium that does not consist of a signal, the computer-readable storage medium having stored computer-executable instructions causing a computing device to perform a computer process implementing the method of claim 11.

13. A method of for enabling, over a network, rate-altering media playback functions at a frame rate expected by a rendering device, the method comprising
    receiving a command over the network from the rendering device to initiate a selected rate-altering media playback function;
    generating a series of frames for transmission to the rendering device over the network by inserting one or more intermediate frames into a stream of frames when insufficient frames originally exist in the stream of frames to fulfill the frame rate expected by the rendering device; and
    adjusting frame timestamps of each of the frames in the stream of frames after the inserting operation and before transmission of the stream of frames at the frame rate expected by the rendering device by adding a product of the total number of inserted frames to that point and an inverse of the frame rate expected by the rendering device.

14. A computer-readable storage medium that does not consist of a signal, the computer-readable storage medium having stored computer-executable instructions causing a computing device to perform a computer process implementing the method of claim 13.

15. A method of for enabling, over a network, rate-altering media playback functions at a frame rate expected by a rendering device, the method comprising
    receiving a command over the network from the rendering device to initiate a selected rate-altering media playback function;
    deleting frames from a stream of frames in excess of the frame rate expected by the rendering device;
    subtracting frame timestamps of adjacent frames originally in the stream of frames to determine a difference;
    dividing the difference by a play rate corresponding the a selected, rate-altering media playback function to determine a quotient;
    adding the quotient to an earlier frame of the adjacent frames to determine a first sum;
    substituting the first sum for the frame timestamp of the earlier frame;
    multiplying a respective insertion number of a respective of the one or more intermediate frames by an inverse of the frame rate to determine a product;
    adding the product to the first sum to determine a second sum; and
    assigning the second sum as a generated timestamp to the respective one of the one or more intermediate frames.

16. A computer-readable storage medium that does not consist of a signal, the computer-readable storage medium having stored computer-executable instructions causing a computing device to perform a computer process implementing the method of claim 15.

17. A method for emulating rate-altering media playback functions for playback of a media stream across a network on a constant frame rate rendering device, the method comprising
    receiving a command at a media server over the network from the rendering device to initiate a selected rate-altering media playback function;
    accessing, by the media server, an original media stream having sequential frame timestamps;
    generating an intermediate series of frames at the media server for transmission to the rendering device over the network by deleting frames having frame timestamps from the original media stream in excess of the constant frame rate when the selected rate-altering media playback function corresponds to an increased play rate;
    generating an intermediate series of frames at the media server for transmission to the rendering device over the network by inserting one or more intermediate frames that do not have timestamps into the original media stream when the selected rate-altering media playback function corresponds to a decreased play rate and insufficient source frames exist in the original media stream to meet the constant frame rate of the rendering device;
    detecting discontinuity in frame timestamps between frames in the intermediate series of frames with respect to a constant timestamp increment of the rendering device, the detected discontinuity in the frame timestamps caused by deletion of frames from the original media stream when the selected rate-altering media playback function corresponds to the increased play rate and caused by insertion of one or more intermediate frames into the original media stream when the selected rate-altering media playback function corresponds to the decreased play rate; and
    providing the intermediate series of frames with sequential frame timestamps separated by the constant timestamp increment of the rendering device before transmission of frames in the intermediate series of frames over the network to account for the detected discontinuity with respect to the constant frame rate of the rendering device by:
        adjusting frame timestamps of all frames in the intermediate series of frames having frame timestamps according to a frame timestamp of a frame from the original media stream immediately preceding the command to initiate the selected rate-altering media playback function and a play rate corresponding to the selected rate-altering media playback function, and assigning frame timestamps to the intermediate frames that do not have frame timestamps inserted into the original media stream when the selected rate-altering media playback function corresponds to the decreased play rate.

18. The method of claim 17, wherein the one or more intermediate frames inserted into the original media stream are duplicate frames of another frame in the original media stream.

19. The method of claim 17, wherein the one or more intermediate frames inserted into the original media stream are interpolated frames from at least one frame in the original media stream.

20. A computer-readable storage medium having stored computer-executable instructions causing a computing device to perform a computer process implementing the method of claim 17.

21. A media server comprising a processor;

a memory under control of the processor, wherein the memory stores original media content having sequential frame timestamps;

an audio/video control module, under control of the processor, that receives a command to initiate a rate-altering media playback function over a network from a constant frame rate rendering device;

an audio/video source module, under control of the audio/video control module and the processor, that accesses the original media content stored on the memory;

an audio/video sample manipulator module, under control of the audio/video control module and the processor, that:

receives the original media content from the audio/video source module, manipulates the original media content to generate an intermediate series of frames for transmission to the rendering device that emulates an increased or decreased play rate corresponding to the rate-altering media playback function, detects discontinuity in frame timestamps between frames in the intermediate series of frames with respect to a constant timestamp increment of the rendering device, the detected discontinuity in the frame timestamps caused by manipulating the original media content to delete frames having frame timestamps from the original media content when the rate-altering media playback function corresponds to the increased play rate or insert intermediate frames that do not have frame timestamps into the original media content when the rate-altering media playback function corresponds to the decreased play rate, provides the intermediate series of frames with sequential frame timestamps separated by the constant timestamp increment of the rendering device before transmission of frames in the intermediate series of frames over the network to account for the detected discontinuity with respect to the constant timestamp increment by:

adjusting frame timestamps of all frames in the intermediate series of frames having frame timestamps according to a frame timestamp of a frame from the original media content immediately preceding the command to initiate the rate-altering media playback function and a play rate corresponding to the rate-altering media playback function, and assigning frame timestamps to the intermediate frames that do not have frame timestamps inserted into the original media content when the rate-altering media playback function corresponds to the decreased play rate, and outputs the intermediate series of frames over the network to the rendering device at the constant rate of the rendering device.

22. The media server of claim 21, wherein the audio/video sample manipulator module deletes frames from the original media content in excess of the constant rate of the rendering device.

23. The media server of claim 21, wherein the audio/video sample manipulator module inserts one or more intermediate frames into the original media content when insufficient frames originally exist in the original media content to fulfill the constant rate of the rendering device.

24. The media server of claim 21, further comprising a network link for transmission of the intermediate series of frames over the network to the rendering device.

* * * * *